United States Patent
Szczepaniak et al.

(10) Patent No.: US 10,239,452 B1
(45) Date of Patent: Mar. 26, 2019

(54) MINIMIZING FALSE COLLISION AVOIDANCE WARNINGS

(71) Applicant: Ford Global Technologies, LLC, Dearborn, MI (US)

(72) Inventors: Alex Szczepaniak, Ann Arbor, MI (US); Gopichandra Surnilla, West Bloomfield, MI (US); Hao Zhang, Ann Arbor, MI (US); Dennis Craig Reed, Dexter, MI (US); Timothy Mark Feldkamp, Ann Arbor, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 15/814,352

(22) Filed: Nov. 15, 2017

(51) Int. Cl.
*B60Q 9/00* (2006.01)
*B60W 30/08* (2012.01)
*G08G 1/16* (2006.01)
*G08G 1/01* (2006.01)

(52) U.S. Cl.
CPC ............ *B60Q 9/008* (2013.01); *B60W 30/08* (2013.01); *G08G 1/0104* (2013.01); *G08G 1/163* (2013.01); *G08G 1/166* (2013.01)

(58) Field of Classification Search
CPC ........ A42B 3/30; A42B 3/303; H01Q 1/2291; H01Q 1/276; H04B 2001/3866; B60Q 9/008; B60W 30/08; G08G 1/0104; G08G 1/163; G08G 1/166
USPC .... 340/903, 995.19, 995.21, 995.22, 995.25; 701/410, 411, 417, 428, 442, 445, 446, 701/534
See application file for complete search history.

(56) References Cited

U.S. PATENT DOCUMENTS

| 6,853,919 | B2 | 2/2005 | Kellum | |
|---|---|---|---|---|
| 8,315,389 | B2* | 11/2012 | Qiu | G01S 5/0252 380/258 |
| 8,548,734 | B2* | 10/2013 | Barbeau | G01C 21/3617 701/410 |
| 8,744,675 | B2 | 6/2014 | King et al. | |
| 9,260,059 | B2 | 2/2016 | Rayes et al. | |
| 9,321,441 | B1 | 4/2016 | Shah et al. | |
| 9,688,273 | B2 | 6/2017 | Mudalige et al. | |
| 2002/0121989 | A1* | 9/2002 | Burns | G08G 1/096827 340/901 |
| 2004/0172153 | A1* | 9/2004 | Zhang | B22D 11/161 700/146 |

(Continued)

OTHER PUBLICATIONS

Elwart et al. article entitled "Drive History Location, Route and Attribute Learning for the Augmentation of Onboard Vehicle Features," SRR-2014-0241, Project No. 12978x dated Dec. 4, 2014, Ford Proprietary, Copyright 2014, Ford Motor Company, http://www.rlis.ford.com/techreports/index.html.

*Primary Examiner* — Ojiako K Nwugo
(74) *Attorney, Agent, or Firm* — Frank A. MacKenzie; Bejin Bieneman PLC

(57) ABSTRACT

A route learning system for a vehicle and a method of using the system is described. The method includes: in response to determining that a current location matches a historical location, retrieving from memory false alert geotag that includes historical path data; and based on determining that a currently-predicted path does not match the historical path, replacing the currently-predicted path with the historical path to mitigate a false warning to a driver of a host vehicle.

20 Claims, 5 Drawing Sheets

(56) References Cited

U.S. PATENT DOCUMENTS

| | | | | |
|---|---|---|---|---|
| 2005/0143918 | A1* | 6/2005 | Hilliard | G01S 19/19 |
| | | | | 701/301 |
| 2008/0248815 | A1* | 10/2008 | Busch | H04W 4/029 |
| | | | | 455/456.5 |
| 2010/0070171 | A1* | 3/2010 | Barbeau | G01C 21/3484 |
| | | | | 701/408 |
| 2011/0181470 | A1* | 7/2011 | Qiu | G01S 5/0252 |
| | | | | 342/417 |
| 2012/0245838 | A1* | 9/2012 | Van Doorselaer | G01C 15/002 |
| | | | | 701/408 |
| 2013/0238241 | A1* | 9/2013 | Chelotti | G01C 21/3617 |
| | | | | 701/533 |
| 2014/0088864 | A1* | 3/2014 | Lamarca | G01C 21/34 |
| | | | | 701/465 |
| 2014/0279723 | A1* | 9/2014 | McGavran | G06N 99/005 |
| | | | | 706/11 |
| 2015/0073702 | A1* | 3/2015 | Jouaux | G06Q 10/047 |
| | | | | 701/465 |
| 2015/0307023 | A1* | 10/2015 | Rayes | B60T 7/22 |
| | | | | 701/1 |
| 2016/0040630 | A1* | 2/2016 | Li | F02M 25/0809 |
| | | | | 73/40.5 R |
| 2017/0069000 | A1* | 3/2017 | Duleba | G06Q 30/0282 |
| 2017/0072850 | A1* | 3/2017 | Curtis | B60W 50/0097 |
| 2017/0110012 | A1 | 4/2017 | Lewis et al. | |
| 2017/0215032 | A1* | 7/2017 | Horbal | H04W 4/02 |
| 2017/0219373 | A1* | 8/2017 | DiMeo | G08G 1/0112 |
| 2017/0243485 | A1* | 8/2017 | Rubin | H04W 72/005 |
| 2017/0262790 | A1* | 9/2017 | Khasis | G01C 21/3461 |
| 2018/0037117 | A1* | 2/2018 | Koebler | B60W 50/00 |
| 2018/0048945 | A1* | 2/2018 | Al Mohizea | H04N 5/91 |

\* cited by examiner

MINIMIZING FALSE COLLISION AVOIDANCE WARNINGS

BACKGROUND

Modern vehicle collision avoidance systems may detect a potential vehicle collision and provide an alert to a vehicle driver. In this manner, the driver may have time to respond and avoid a collision. An example of such an alert includes an illuminated symbol on a vehicle instrument panel, an audible alert, or the like.

DETAILED DESCRIPTION

Figure 1:
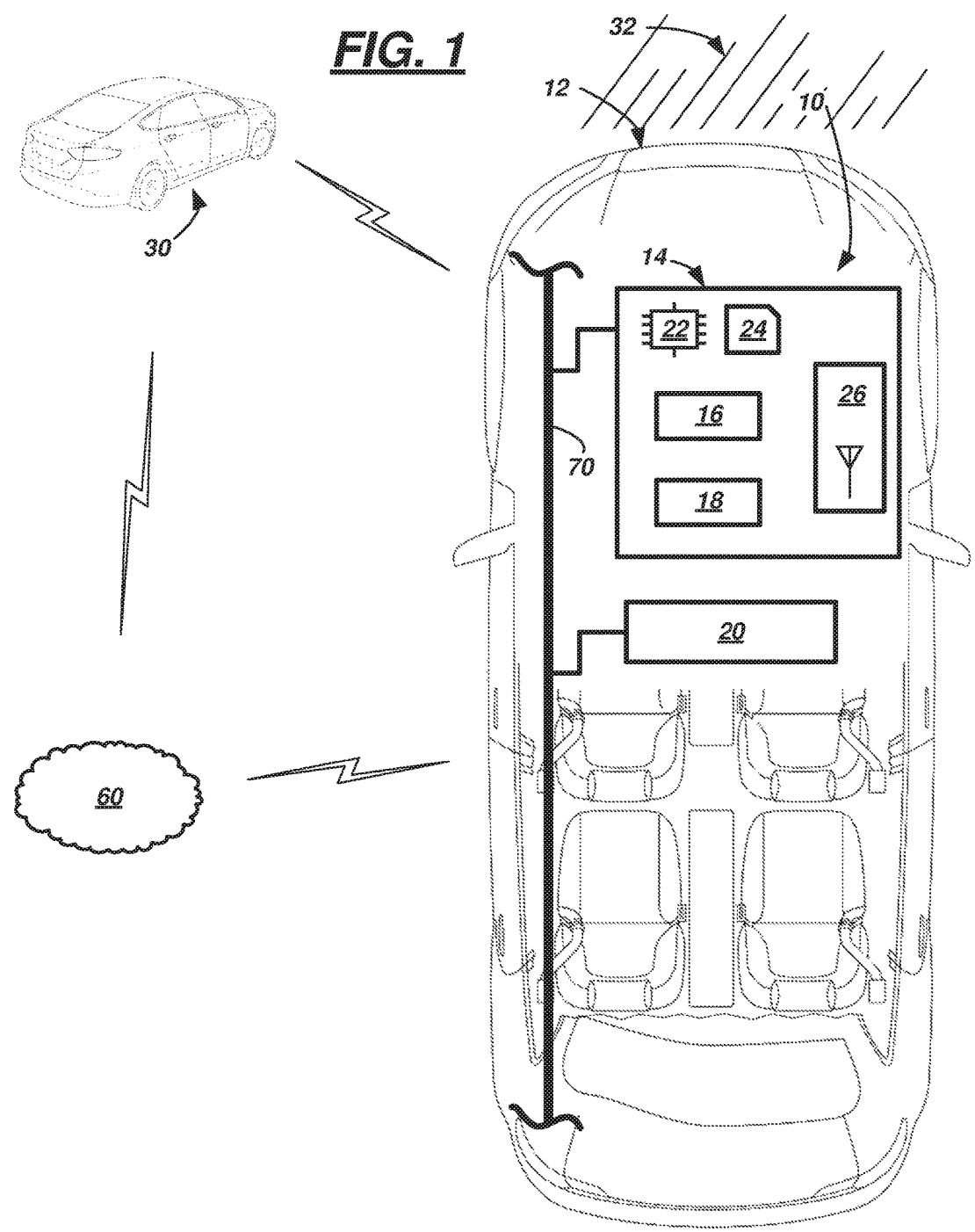
FIG. 1 is a schematic diagram illustrating an exemplary target vehicle and a route learning system for a host vehicle.

A route learning system for a vehicle is described. According to one illustrative example, the system can include an onboard computer programmed to execute a method. The method may include: at a computer in a host vehicle: in response to determining that a current location matches a historical location, retrieving from memory false alert geotag that includes historical path data; and based on determining that a currently-predicted path does not match the historical path, replacing the currently-predicted path with the historical path to mitigate a false warning to a driver of the vehicle According to the at least one example set forth above, wherein the geotag was stored previously in memory in response to, at the computer: receiving a collision avoidance alert; and determining that an actual path of the vehicle, after receiving the alert, differed from a predicted path at a time thereof.

According to the at least one example set forth above, wherein the alert is based at least partially on receiving a vehicle-to-vehicle communication from a target vehicle.

According to the at least one example set forth above, wherein the actual path is determined using a plurality of path points.

According to the at least one example set forth above, wherein each of the path points comprise a respective pair of x- and y-coordinates, wherein, in determining the actual path, a respective z-axis coordinate of each respective path point is ignored.

According to the at least one example set forth above, further comprising: storing a first path point, then storing a second path point following a first interval, and then storing a third path point following a second interval.

According to the at least one example set forth above, wherein determining that the currently-predicted path does not match the historical path further comprises comparing a predicted radius or predicted curvature of the currently-predicted path with a historical radius of the historical path or a corresponding historical curvature thereof.

According to the at least one example set forth above, further comprising determining that the currently-predicted path does not match the historical path by comparing a predicted radius or predicted curvature of the currently-predicted path with a historical radius of the historical path or a corresponding historical curvature thereof.

According to the at least one example set forth above, further comprising determining a range to a nearest starting point location from among a plurality of false alert geotags, and based on the determined range, delaying comparing current location with historical location data of the plurality.

According to the at least one example set forth above, further comprising: replacing the currently-predicted path at a false alert detection system of the computer; and sending the replaced currently-predicted path from the false alert detection system to a collision avoidance system in the computer which generated an alert.

According to another illustrative example, a route learning system comprises: a computer in a host vehicle, comprising a processor and memory storing instructions executable by the processor, the instructions comprising, to: in response to determining that a current location matches a historical location, retrieve from memory false alert geotag that includes historical path data; and based on determining that a currently-predicted path does not match the historical path, replace the currently-predicted path with the historical path to mitigate a false warning to a driver of the vehicle.

According to the at least one example set forth above, wherein the geotag was stored previously in memory in response to instructions to: receive a collision avoidance alert; and determine that an actual path of the vehicle, after receiving the alert, differed from a predicted path at a time thereof.

According to the at least one example set forth above, wherein the alert is based at least partially on receiving a vehicle-to-vehicle communication from a target vehicle.

According to the at least one example set forth above, wherein the actual path is determined using a plurality of path points.

According to the at least one example set forth above, wherein each of the path points comprise a respective pair of x- and y-coordinates, wherein, in determining the actual path, a respective z-axis coordinate of each respective path point is ignored.

According to the at least one example set forth above, wherein the instructions further comprise, to: store a first path point, then store a second path point following a first interval, and then store a third path point following a second interval.

According to the at least one example set forth above, wherein the instruction to determine that the currently-predicted path does not match the historical path further comprises an instruction to compare a predicted radius or predicted curvature of the currently-predicted path with a historical radius of the historical path or a corresponding historical curvature thereof.

According to the at least one example set forth above, wherein the instruction to determine that the currently-predicted path does not match the historical path comprises an instruction to compare a predicted center of a circle that comprises the predicted radius or predicted curvature with a historical center location of a circle associated with the historical radius or a corresponding historical curvature thereof.

According to the at least one example set forth above, further comprising determining a range to a nearest starting point location from among a plurality of false alert geotags, and based on the determined range, delaying comparing current location with historical location data of the plurality.

According to the at least one example set forth above, wherein the instructions further comprise, to: replace the currently-predicted path at a false alert detection system of the computer; and send the replaced currently-predicted path from the false alert detection system to a collision avoidance system in the computer which generated an alert.

According to the at least one example, a computer is disclosed that is programmed to execute any combination of the examples set forth above.

According to the at least one example, a computer is disclosed that is programmed to execute any combination of the examples of the method(s) set forth above.

According to the at least one example, a computer program product is disclosed that includes a computer readable medium storing instructions executable by a computer processor, wherein the instructions include any combination of the instruction examples set forth above.

According to the at least one example, a computer program product is disclosed that includes a computer readable medium that stores instructions executable by a computer processor, wherein the instructions include any combination of the examples of the method(s) set forth above.

Turning now to the figures, wherein like elements are illustrated using like or similar numerals, a route learning system 10 for a host vehicle 12 is illustrated. The route learning system 10 comprises a computer 14 which may include a collision avoidance system 16 and a false alert detection system 18. As will be explained more below, the collision avoidance system 16, among other things, may comprise a set of iteratively executed computer-implemented instructions (e.g., an algorithm) which predict a current path (of host vehicle 12) and thereafter may use that prediction information to determine—based on a number of factors—whether a probability of collision is likely, imminent, etc. The algorithm may be configured to provide a warning to a user (e.g., a driver) of vehicle 12 based on a probability of collision. In addition, in some implementations, the warning may be coupled with autonomous vehicle operation (e.g., autonomous braking, autonomous steering, etc.)—e.g., computer-controlled actions taken on behalf of the driver. However, in the present disclosure, the false alert detection system 18 may determine that at least some alerts generated by the collision avoidance system 16 are false (e.g., false positives) and thereby avoid providing a corresponding warning to the driver. As will be explained more below, when the vehicle 12 approaches or traverses (again) a location which previously generated a false alert (at the collision avoidance system 16), the false alert detection system 18 may use historical data to determine whether to alter a currently-predicted path of vehicle 12—e.g., replacing currently-predicted path data (e.g., determined by collision avoidance system 16) with historical path data (e.g., associated with the previously-determined false alert). In this manner, the route learning system 10 may not generate another false warning to the driver at the same location and/or based on similar circumstances. Consequently, the driver may be issued fewer false warnings thereby improving the user's experience.

FIG. 1 illustrates an illustrative host vehicle 12 that comprises route learning system 10. Vehicle 12 is shown as a passenger car; however, vehicle 12 could also be a truck, sports utility vehicle (SUV), recreational vehicle, bus, train car, aircraft, or the like that includes the route learning system 10. In at least some examples, host vehicle 12 may be operated in one or more autonomous driver assist modes, wherein vehicle 12 controls steering, acceleration, and braking under certain circumstances without human interaction; however, this is not required.

Route learning system 10 comprises computer 14 and a position-determining unit 20. The computer 14 is shown as a single computing device comprising the collision avoidance system 16, the false alert detection system 18, a processor 22, memory 24, and a telematics device 26. According to at least one example, computer 14 is a vehicle-to-vehicle (V2V) communication module (e.g., which uses the telematics device 26 to communicate with other vehicles); however, this is merely one example. For example, computer 14 could be a body control module (BCM), an autonomous driving mode module, or the like instead. Components 16-18, 22-26 may be comprised of hardware, software instructions, or a combination thereof (and e.g., each component of computer 14 will be discussed in turn). In addition, while systems 16-18, processor 22, memory 24, and telematics device 26 are shown within a single device (e.g., computer 14), it should be appreciated that these components—in other examples—may be partitioned according to hardware, software, or a combination thereof.

Figure 5:
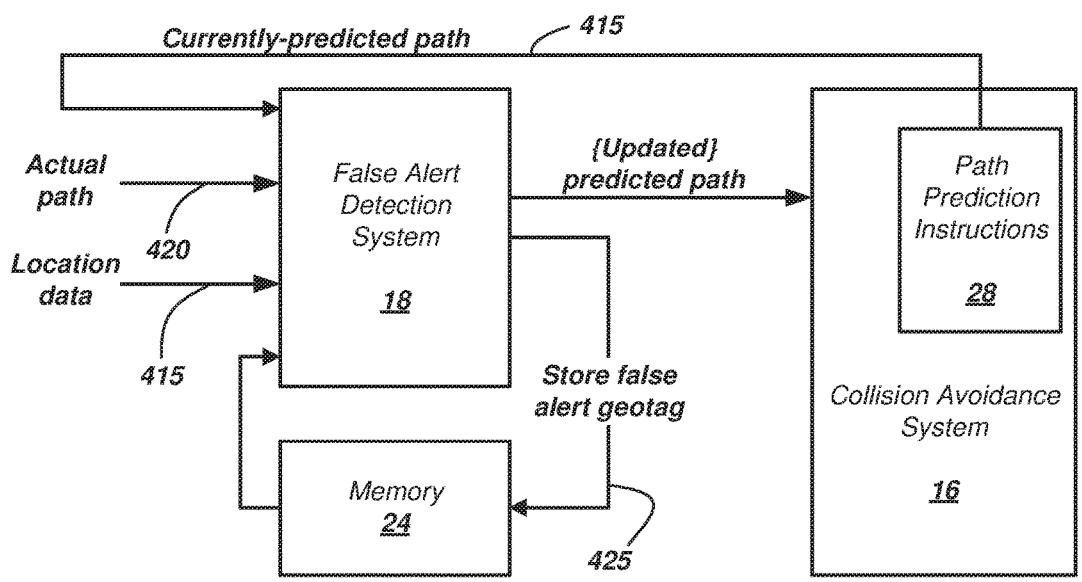
FIG. 5 illustrates a software architecture diagram of the route learning system which comprises a collision avoidance system and a false alert detection system.

Collision avoidance system 16 may comprise an electrical circuit, a software algorithm, or a combination thereof that is configured to determine whether a collision event is likely (or more likely than a threshold) to occur and to provide instructions to assist in avoiding the collision to one or more of other vehicle systems, the vehicle driver, etc. According to at least one aspect of the collision avoidance system 16, the system 16 is programmed to compute a currently-predicted path of host vehicle 12—e.g., more particularly, a projected short-term path of vehicle 12. In this manner, the system 16 may determine whether another object is likely to intersect the currently-predicted path and hence whether a collision event is likely. As used herein, a currently-predicted path is a computer-determined route which the computer 14 predicts where the vehicle 12 will travel in the next two (2) to five (5) seconds, the next 50-300 meters, or a combination thereof. According to one example (and as shown in FIG. 5), path prediction is determined using a set of path-prediction instructions 28 (which may be stored in memory 24 and) which are executable by processor 22; however, this is merely one example. This computer-determined route may be based on numerous input criteria (e.g., to computer 14)—including but not limited to one or more of a vehicle speed parameter (of host vehicle 12 and/or a target vehicle 30), a vehicle heading parameter (of host vehicle 12 and/or target vehicle 30), a vehicle steering angle parameter (of host vehicle 12 and/or target vehicle 30), localization data relative to host vehicle 12, map data from position-determining unit 20, imaging data of target vehicle(s) 30, imaging data of roadway 32, its lane markers as well as other infrastructure (e.g., signs, curbs, roadway shoulders, etc.), vehicle-to-infrastructure (V2I) communications, etc. As will be explained more below, information regarding target vehicle 30 may be obtained using one or more sensors onboard host vehicle 12 and/or by V2V communication.

By way of illustration, and not intending to be limiting, collision avoidance system 16 may use a current vehicle speed, a current vehicle heading, map data received from unit 20, V2V data (speed, heading, location) from target vehicle 30 (indicating that vehicle 30 is in a blind spot of vehicle 12), an absence of a turn signal indication at host vehicle 12, etc. to determine that—e.g., on a straight section of roadway 32—a currently-predicted path of vehicle 12 is straight and within a currently-occupied pair of lane markers. Some of the same parameters, data, etc. could be used by the collision avoidance system 16 to determine a currently-predicted path of host vehicle 12 when the vehicle is on a curved or angular section of roadway 32. For example, one way of determining currently-predicted path data on a curved roadway is illustrated below.

When the collision avoidance system 16 determines a collision event—and before system 16 issues a warning to the driver, system 16 may provide a collision avoidance alert as output to the false alert detection system 18 so that system 18 may validate the alert. As used herein, a collision avoidance warning is any suitable notification to a driver of the host vehicle 12 indicating that to driver to take some action to avoid a collision, and in at least some examples, the collision avoidance warning includes any suitable computer-controlled vehicle action (e.g., braking, steering, etc.) which at least temporarily assists the driver in avoiding a collision. Non-limiting examples of collision avoidance warnings include a visual notification, an audible notification, a tactile notification, a computer-controlled vehicle action, or combination thereof. As used herein, a false warning is a type of collision avoidance warning—the false warning being generated based on data sensed inaccurately (e.g., by vehicle sensors) or based on inaccurately interpreted data at computer 14 (e.g., received data may be inaccurately quantified and/or qualified).

False alert detection system 18 may comprise an electrical circuit, a software algorithm, or a combination thereof that is configured to determine whether a collision avoidance alert is true or false, and when the alert is determined to be false, to generate and store a false alert geotag. Like the collision avoidance system 16, false alert detection system 18 (in at least one example) may comprise a set of computer-implemented instructions (e.g., stored in memory 24 and) which are executable by processor 22. As used herein, a false alert geotag is electronically-stored data structure that includes a stored geographical location (of a previous false alert) and corresponding actual path data (of host vehicle 12), wherein the actual path data includes data pertaining to the route the host vehicle 12 traversed at that time (which may differ from the then-currently-predicted route). Also, as used herein, an actual path (previously driven by the host vehicle 12) has a duration of less than or equal to five (5) seconds, less than or equal to 300 meters, or a combination thereof.

Figure 6:
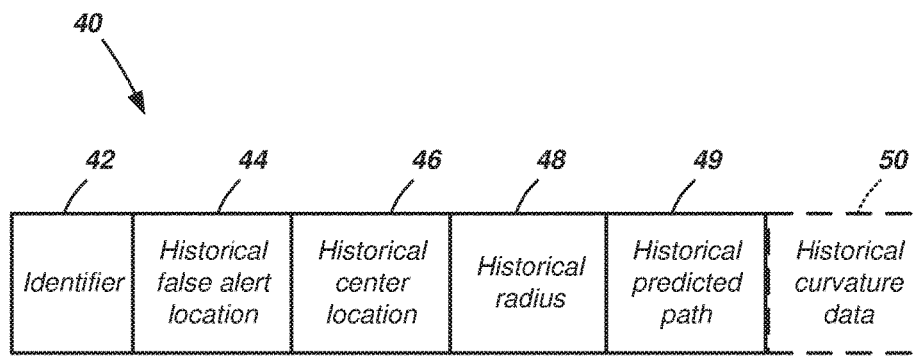
FIG. 6 is a schematic diagram of a false alert geotag.

An example of a false alert geotag 40 is shown in FIG. 6, wherein the illustrated geotag 40 may comprise a unique identifier 42, a historical false alert location 44 (e.g., the stored geographical location of a previous false alert), a historical center location 46 of a circle that defines a portion of the actual path (discussed below), a historical radius 48 of the circle (also discussed below), a historical predicted path at a time of the previous false alert 49 (as used herein, a historical predicted path is the current predicted path at that time (e.g., as discussed below in FIG. 4, block 415), which in one example is defined by a sequence of several spaced-from-one-another points), and/or optional historical curvature data 50 (corresponding to the radius 48 and also discussed below). As used herein, a historical false alert location (or simply historical location) is a geographical identifier of a location wherein a false alert was previously determined. And as used herein, historical path data comprises data identifying an actual path taken by the vehicle 12, wherein this actual path was associated with the same false alert.

Thus, by the collision avoidance system 16 sending collision avoidance alerts to false alert detection system 18, system 18 may generate new false alert geotags and store these in memory 24. Then, when the vehicle 12 is approaching a geographical location associated with a previously-generated geotag, the false alert detection system 18 may identify that the collision avoidance alert matches one of a plurality of false alert geotags (e.g., by matching a current host vehicle location with a historical false alert location 44). As will be explained below, false alert detection system 18 may overwrite the currently-predicted path (at the collision avoidance system 16) with the historical path data stored in the respective geotag—e.g., so that the collision avoidance system 16 does not generate a false warning to the driver of vehicle 12.

Processor 22 can be any type of device capable of processing electronic instructions, non-limiting examples including a microprocessor, a microcontroller or controller, an application specific integrated circuit (ASIC), etc.—just to name a few. In general, computer 14 may be programmed to execute digitally-stored instructions, which may be stored in memory 24, which enable the computer 14, among other things, to: in response to determining that a current location and/or path of the vehicle matches a historical location and/or path thereof, retrieving from memory false alert geotag that includes historical path data, of the vehicle, which extends from the historical location; and, among other things (as discussed below), based on determining that a currently-predicted path of the vehicle does not match the historical path, replacing the currently-predicted path with the historical path to mitigate a false warning to a driver of the vehicle. This is merely a couple of examples of instructions; other instructions also exist.

Memory 24 may include any non-transitory computer usable or readable medium, which may include one or more storage devices or articles. Exemplary non-transitory computer usable storage devices include conventional hard disk, solid-state memory, random access memory (RAM), read-only memory (ROM), erasable programmable read-only memory (EPROM), electrically erasable programmable read-only memory (EEPROM), as well as any other volatile or non-volatile media. Non-volatile media include, for example, optical or magnetic disks and other persistent memory, and volatile media, for example, also may include dynamic random access memory (DRAM). These storage devices are non-limiting examples; e.g., other forms of computer-readable media exist and include magnetic media, compact disc ROM (CD-ROMs), digital video disc (DVDs), other optical media, any suitable memory chip or cartridge, or any other medium from which a computer can read. As discussed above, memory 24 may store one or more computer program products which may be embodied as software, firmware, or other programming instructions executable by the processor 22.

Telematics device 26 may be any suitable telematics computing device configured to wirelessly communicate with other electronic devices, including target vehicle(s) 30. For example, device 26 may comprise a wireless chipset, antenna, and other electronic components (none of which are shown) facilitating dedicated short range communication (DSRC)—e.g., for vehicle-to-vehicle (V2V) communication. Of course, this is merely one example; other examples exist. For instance, telematics device 26 may communicate via one or more of DSRC, long-range wireless communication (e.g., cellular links using LTE, GSM, CDMA, etc.), short-range wireless communication (e.g., Bluetooth, Wi-Fi, Wi-Fi Direct, etc.), or the like. In addition, telematics device 26 may communicate via any suitable wireless infrastructure 60 (e.g., supporting vehicle-to-infrastructure (V2I) communication or the like). According to at least one example, host vehicle 12 receives speed parameters, heading parameters, steering angle parameters, and the like from target vehicles 30 via telematics device 26; and the collision avoidance system 16 uses this target vehicle information when determining whether to generate a collision avoidance alert.

Turning now to position-determining unit 20, the unit may comprise any suitable device for determining position or location data of host vehicle 12 with respect to a frame of reference. Non-limiting examples of unit 20 include a Global Positioning System (GPS), a Global Navigation Satellite System (GLONASS), or the like. In at least one example, the position-determining unit 20 provides GPS coordinate data. It should be appreciated that below, location data from unit 20 is described below as Cartesian coordinate data; however, this is merely an example. Other examples exist as well.

FIG. 1 also illustrates a network connection 70 in host vehicle 12 which, among other things, facilitates wired or wireless communication between computer 14, position-determining unit 20, and/or other onboard electronic devices. In at least one example, connection 70 may enable communication between collision avoidance system 16 and false alert detection system 18 (e.g., particularly where these systems are partitioned in hardware). According to at least one example, the connection 70 includes one or more of a controller area network (CAN) bus, Ethernet, Local Interconnect Network (LIN), a fiber optic connection, or the like. Other examples also exist. For example, alternatively or in combination with e.g., a CAN bus, connection 70 could comprise one or more discrete wired or wireless connections.

As discussed above, FIG. 1 also illustrates communication network 60 that may include any suitable wired or wireless communication infrastructure (e.g., including wired cable and telephone infrastructure, vehicle-to-infrastructure (V2I), short range wireless communication infrastructure, medium and/or long-range wireless infrastructure, etc.). Network 60 may comprise a land communication network that can enable connectivity to public switched telephone network (PSTN) such as that used to provide hardwired telephony, packet-switched data communications, internet infrastructure, and the like. And network 60 may comprise any suitable wireless communication network that may include satellite communication architecture and/or may include cellular telephone communication over wide geographic region(s). Thus, in at least one example, network 60 includes any suitable cellular infrastructure that could include eNodeBs, serving gateways, base station transceivers, and the like. Further, network 60 may utilize any suitable existing or future cellular technology (e.g., including LTE, CDMA, GSM, etc.). V2I, land communication networks, and wireless communication networks are generally known in the art and will not be described further herein. In some examples, via network 60, vehicles 12, 30 may communicate with one another, and host vehicle 12 may receive other relevant information which may be used by collision avoidance system 16 to determine whether to issue a collision avoidance alert.

Figure 2:
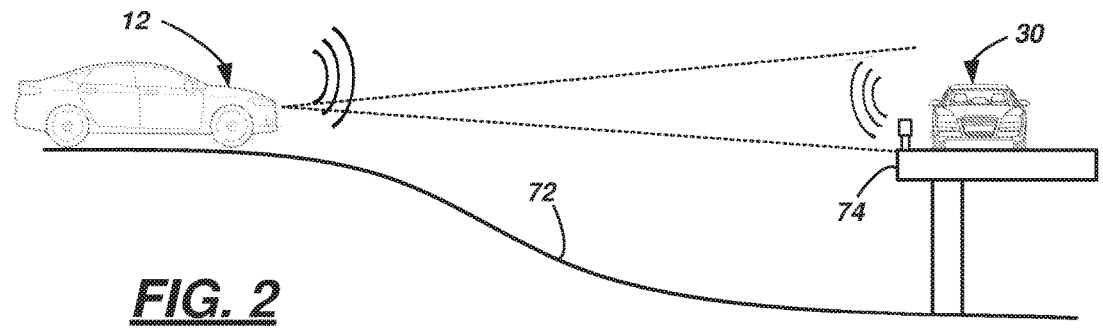
FIGS. 2-3 illustrate schematic diagrams of exemplary scenarios in which a false collision avoidance alert may be generated.
Figure 3:
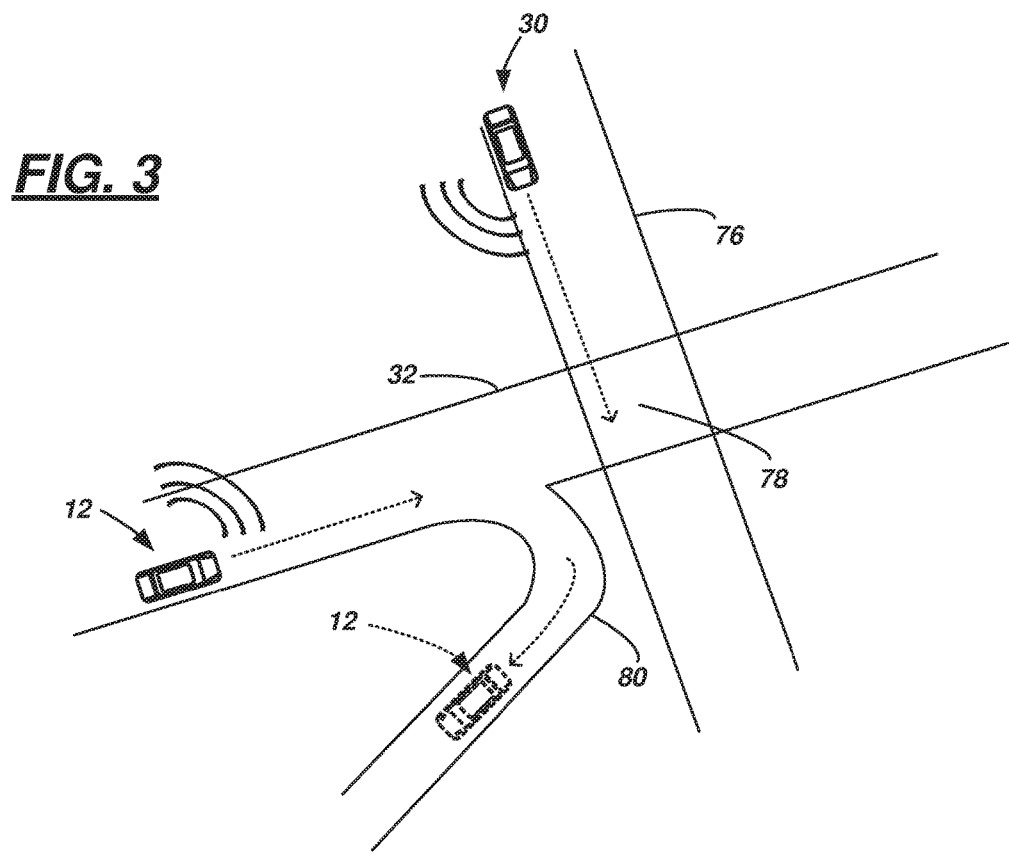

Turning now to FIGS. 2-3, these illustrations show exemplary scenarios in which a collision avoidance alert may be generated by the route learning system 10. For example, in FIG. 2, collision avoidance system 16 of host vehicle 12 may generate a false collision avoidance alert with respect to target vehicle 30 based on a number of criteria which indicate that target vehicle 30 is likely to collide with vehicle 12. For instance, host vehicle 12 may be descending a hill 72 which passes below a bridge 74 (upon which target vehicle 30 is about to cross). As vehicle 30 approaches the bridge 74 and prior to vehicle 12 descending the hill 72, collision avoidance system 16 may determine a potential interference and collision based on, among other things: position, speed, and heading data of host vehicle 12; V2V data from target vehicle 30 (e.g., position, speed, heading, etc. of vehicle 30); imaging data from sensors onboard vehicle 12 (e.g., line-of-sight (LOS) data); map data (e.g., which may not indicate that one road passes beneath the other); a combination thereof; or the like.

According to another example, shown in FIG. 3, system 16 may generate a collision avoidance alert which also may be determined to be false (by false alert detection system 18) based on the circumstances at a like or similar intersection. For example, host vehicle 12 may be traveling to the driver's regular place of work on roadway 32 and target vehicle 30 may be traveling on an intersecting roadway 76. Using similar or identical data (received and/or determined at vehicle 12), collision avoidance system 16 may determine a potential collision with vehicle 30 (e.g., at intersection 78). However, prior to reaching the intersection 78, vehicle 12 may turn onto a roadway 80 which no longer presents a potential collision with vehicle 30.

FIGS. 2-3 illustrate a couple of possible scenarios wherein false alerts may be generated by collision avoidance system 16. Other scenarios exist. Further, in some instances (e.g., such as the scenario in FIG. 3), repeated occurrences (e.g., over a course of days, weeks, etc., as the driver repeatedly turns on roadway 80 to go to work) may be required before a false warning to the driver is inhibited by computer 14.

Figure 4:
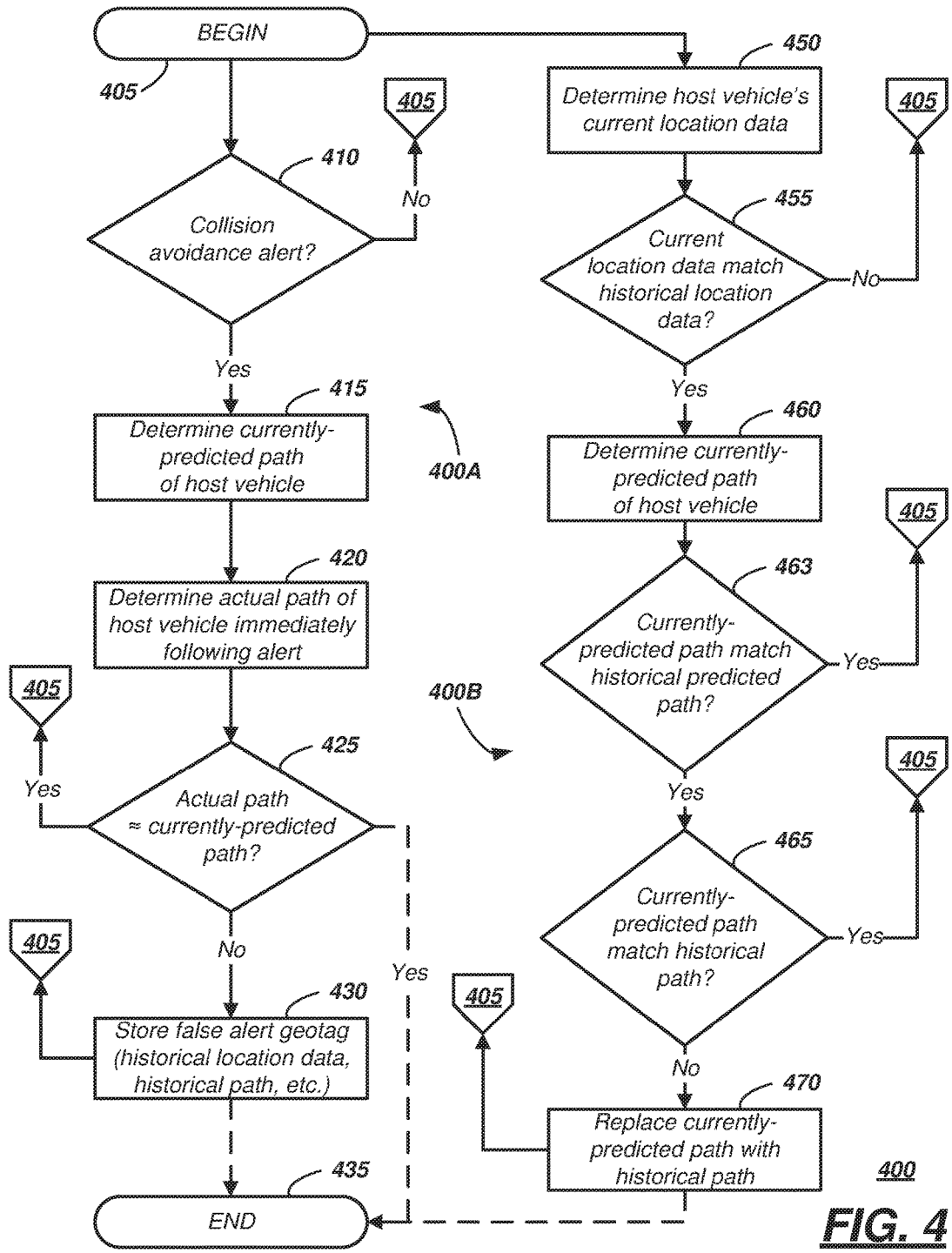
FIG. 4 is a flow diagram illustrating a process, which may be carried out by a computer of the host vehicle, for minimizing false warnings to a driver thereof.

Turning now to FIG. 4, the flow diagram illustrates a process 400 for minimizing false warnings to a driver of the host vehicle 12. More particularly, process 400 illustrates two processes which may be carried out concurrently in some instances—a first process 400A which comprises blocks 405-435 and a second process 400B which comprises blocks 405, 435, and 450-470.

Process 400A begins with block 405 (labeled BEGIN). In block 405, host vehicle ignition is in an ON state. In at least one example, host vehicle 12 is moving along roadway 32. This roadway implementation is merely one example; off-road and other path implementations exist as well.

In block 410, which follows block 405, processor 22 of computer 14 determines whether a collision avoidance alert has been generated. As discussed above, in some examples, collision avoidance system 16 may be repeatedly determining whether a currently-predicted path is likely to lead to a collision with a target vehicle 30 (e.g., based on a current or future position of target vehicle 30). Or in other instances, triggers or other circumstances may exist which cause the collision avoidance system 16 to determine a currently-predicted path. Regardless, when processor 22 determines a collision avoidance alert, process 400 proceeds to block 415, and when no alert is generated, then the process loops back and repeats block 405.

In block 415, the false alert detection system 18 determines the currently-predicted path of the host vehicle 12. Using the illustrative architecture diagram of FIG. 5, the collision avoidance system 16 may provide an indication to the false alert detection system 18 of the currently-predicted path. In other examples, the currently-predicted path may be determined within system 18 or elsewhere instead.

According to one example, block 415 includes determining a starting point ($SP_{predicted}$) of the currently-predicted path, a predicted radius ($R_{predicted}$) of the currently-predicted path, and a predicted center point ($C_{predicted}$) of the currently-predicted path, wherein the radius ($R_{predicted}$) and center point ($C_{predicted}$) define a circle and the currently-predicted path includes a curved portion of the circle and wherein the starting point ($SP_{predicted}$) defines where on the circle the currently-predicted path begins. In some instances, the starting point ($SP_{predicted}$) may be a current location of vehicle 12 (GPS coordinate data received via the network connection 70 from position-determining unit 20).

Figure 7:
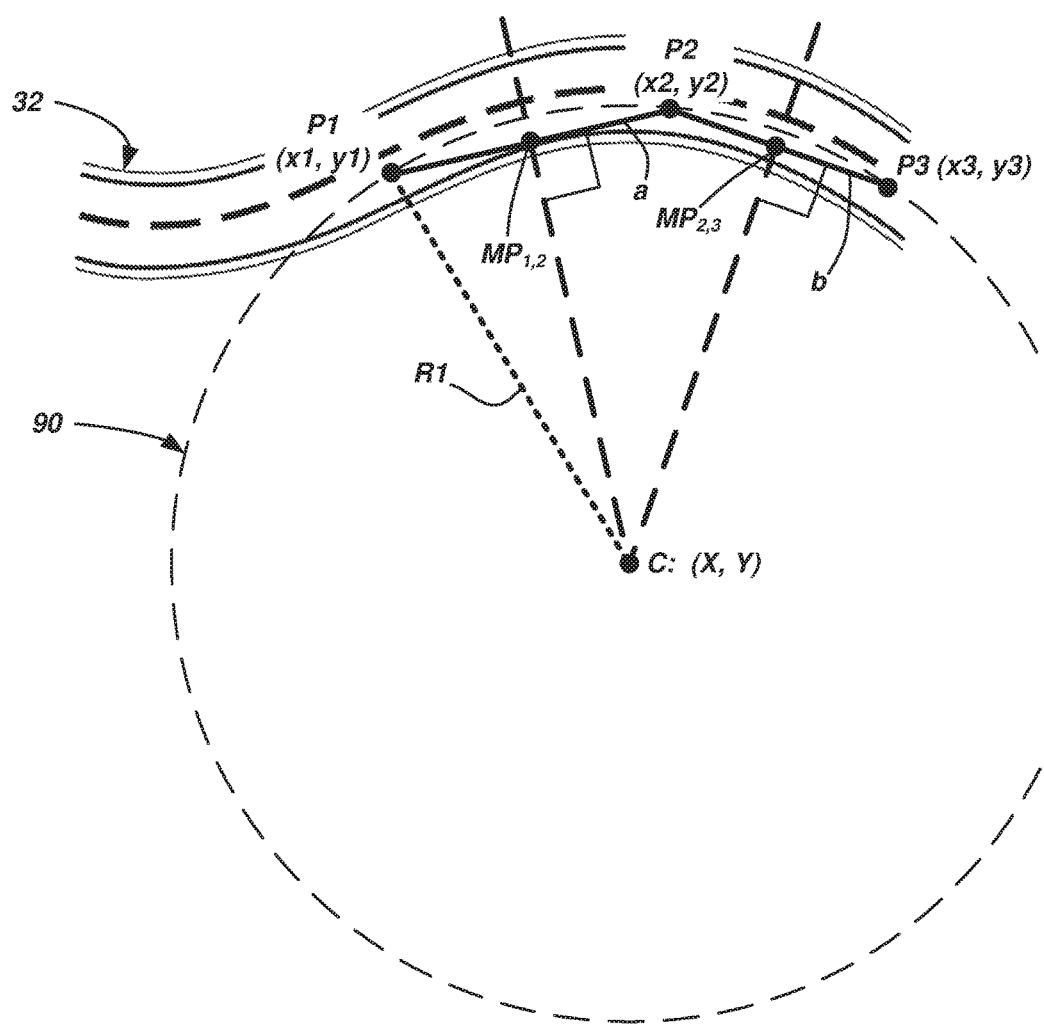
FIG. 7 is a schematic diagram of a plurality of path points of the host vehicle along an exemplary section of roadway.

In block 420 which follows, computer 14 may determine an actual path of the host vehicle (e.g., immediately following the alert)—e.g., so that this actual path may be compared to the currently-predicted path (determined in block 415). FIG. 7 illustrates an exemplary technique for determining the actual path. According to at least one example, the actual path data and the currently-predicted path data comprise vector quantities (e.g., determining path in block 415 and 420 also includes determining an indication of direction).

FIG. 7 illustrates several path points P1 (x1, y1), P2 (x2, y2), P3 (x3, y3) along roadway 32 through which host vehicle 12 passes (in block 420) (vehicles 12 and/or 30 are hidden in this view for purposes of clarity). As discussed below, three such points P1-P3 may be used to calculate a center C and a radius R1 (e.g., and/or rate of curvature ($R1^{-1}$) of roadway 32). According to one example, path points P1, P2, P3 are Cartesian coordinates (e.g., derived from GPS data received at computer 14 from position-determining unit 20). According to one example, the actual path is defined by path point P1 (an actual starting point), radius R1, and center point C. In other examples, the actual path may include, alternatively or in addition to those cited above, other criteria such as a curvature of the actual path, a linear length, and/or a formula defining a different shape of the actual path. Thus, while in the example below, the actual path is defined by the two points (P1, C) and a radius (R1), other examples for defining the actual path also exist.

According to one example, path points P1, P2, P3 are determined at predetermined intervals. For example, point P2 is determined following a first interval of time after determining point P1 (e.g., one (1) second later), and point P3 is determined following a second interval of time after determining point P2 (e.g., one (1) second later). Durations of 1 second are merely exemplary; other durations are possible (e.g., including durations between 0.5 seconds and 3 seconds); further, in other examples, the durations of the first and second intervals may vary.

Thus, according the illustrated example, the radius R1 and center point C may be calculated using path points P1, P2, P3 and Equations 1-6 below. Note: chord a (in FIG. 7) is defined by path points P1 and P2, and chord b (FIG. 7) is defined by path points P2 and P3.

Equation 1.

$$y_a = m_a(x-x1)+y1,$$

wherein $m_a$ is a slope of line $y_a$, wherein $$m_a = \frac{y2-y1}{x2-x1}.$$

Equation 2.

$$y_b = m_b(x-x2)+y2,$$

wherein $m_b$ is a slope of line $y_b$, wherein $$m_b = \frac{y3-y2}{x3-x2}.$$

Equations 3-4 are derived from a geometric theorem which states that if a radius is perpendicular to a chord, then it bisects the chord and its arc (e.g., here, the arc P1-P2-P3 is the actual path of the host vehicle 12). Thus, as shown in FIG. 7, a midpoint $MP_{1,2}$ bisects chord a and a midpoint $MP_{2,3}$ bisects chord b. Furthermore, Equations 3-4 are derived in part based on a proof which states that when two lines intersect at a perpendicular angle, the slope of one line is the negative reciprocal of the other.

Equation 3.

$$y_a' = \frac{-1}{m_a}\left(X - \frac{x1+x2}{2}\right) + \frac{y1+y2}{2},$$

wherein line $y_a'$ defines a line which perpendicularly bisects chord a at midpoint $MP_{1,2}$ and passes through center point C of a circle 90 which is defined by radius R1, wherein center point C may be defined by (X, Y).

Equation 4.

$$y_b' = \frac{-1}{m_b}\left(X - \frac{x2+x3}{2}\right) + \frac{y2+y3}{2},$$

wherein line $y_b'$ defines a line which perpendicularly bisects chord b at midpoint $MP_{2,3}$ and passes through center point C of circle 90.

As both Equations 3 and 4 intersect at center point C, they may be set equal to one another and solved for X and Y. For example, Equation 5 illustrates a formula for calculating X.

Equation 5.

$$X = \frac{m_a m_b(y1-y3) + m_b(x1+x2) - m_a(x2+x3)}{2(m_b - m_a)}$$

The value of Y may be determined by substituting the value of X into either of Equations 3 or 4 (e.g., and solving for $y_a'$ or $y_b'$). The radius R1 may be determined by using a distance formula (Equation 6) to determine a distance between any of path points P1, P2, P3 and center point C.

Equation 6 (e.g., using path point P1 and center point C).

$$R1 = \sqrt{(X-x1)^2 + (Y-y1)^2}$$

Curvature k1, if desired, may be calculated using Equation 7 (e.g., wherein curvature is defined as an inverse of the radius R1).

Equation 7.

$$k1 = \frac{1}{R1}$$

It should be appreciated that the equations above are based on two-dimensional calculation (X, Y). In other examples, they could be based on three-dimensional calculation instead (X, Y, Z). In at least one example, vertical axis (Z) coordinates are considered negligible; e.g., as the actual path measured is less than or equal to 5 seconds (s) of driving, less than 300 meters (m) in length, etc. (e.g., assuming a negligible change in elevation over 5 s or over 300 m). Thus, by basing the calculations on a two-dimensional frame of reference, computational time is improved and computational resources of processor 22 are preserved for other tasks and calculations.

Thus, according to at least one example, actual path comprises starting path point P1, radius R1, and center point C. Having determined the actual path traveled by host vehicle 12, process 400 (FIG. 4) may proceed to block 425.

In block 425, processor 22 may determine whether the actual path (block 420) matches the currently-predicted path (block 415). According to at least one example, this determination may be based on whether the currently-predicted path data (starting point $SP_{predicted}$, radius $R_{predicted}$, and center point $C_{predicted}$) match the corresponding actual path data (P1, radius R1, and center point C). As used herein, a match of data comprises an exact match, as well as one quantity of data being within a threshold quantity of the other quantity of data. For example, a match may comprise a percent difference being less than a threshold (e.g., $$\left| \frac{R1 - R_{predicted}}{R1} \right| < THR_{RAD},$$

wherein threshold $THR_{RAD}$ is a predetermined threshold value), GPS coordinates of $SP_{predicted}$ and P1 being within a predetermined degree of closeness, and/or GPS coordinates $R_{predicted}$ and R1 being within a predetermined degree of closeness.

According to at least one example of block 425, computer may be programmed to determine a match based on a difference of curvatures being less than a predetermined threshold ($THR_{CURV}$), as illustrated in Equation 8.

Equation 8.

$$|k_1 - k_{predicted}| < THR_{CURV},$$

wherein $k_{predicted}$ is defined as the corresponding curvature of the currently-predicted path.

When the actual path of host vehicle 12 does not match the currently-predicted path thereof, then process 400A proceeds to block 430. When it does match, then the process 400A may loop back and repeat block 405. For example, where actual and currently-predicted paths are the same—and a collision avoidance alert was generated—the driver should be issued a warning.

In block 430, where actual and currently-predicted paths are not the same, issuing a warning to the driver may be a false notification (e.g., because the warning may be based on the predicted path, which the vehicle 12 did not follow). In block 430, processor 22 of computer 14 may store in memory 24 false alert data in the form of a false alert geotag. As discussed above (regarding FIG. 6), the geotag may comprise actual path data (e.g., the path the vehicle 12 actually followed) such as: an identifier 42, historical false alert location 44 (e.g., starting point P1), a historical center point 46 (e.g., C), a historical radius 48 (e.g., R1), and a historical predicted path 49 (e.g., several points, such as points P1, P2, P3—in sequential order (e.g., thereby defining direction)). In this manner, as explained below, when vehicle 12 approaches the historical false alert location 44 in the future, the processor 22 may verify that vehicle 12 is traveling along the same direction and path (as it was historically) and then processor 22 may recall and utilize geotag 40 to determine whether to avoid providing a false warning to the driver. Following block 430 (in FIG. 4), process 400A may end (block 435, labeled END) or loop back to block 405 and repeat one or more blocks described above.

Process 400B also begins with block 405. Since block 405 was previously discussed, it will not be re-described here. Process 400B may proceed from block 405 to block 450.

In block 450, computer 14 determines the host vehicle's current location. As discussed above, in at least one example, computer 14 receives GPS coordinate data from position-determining unit 20 (e.g., via network connection 70); again, other examples exist.

In block 455 which follows, processor 22 determines whether the current location data matches the historical false alert location 44 of any stored false alert geotags 40. When the current location data of host vehicle 12 matches one of the historical false alert locations 44, then process 400B proceeds to block 460. When it does not match, the process may loop back and repeat block 405. (Again, a match here may be within a threshold value, as discussed above.)

In block 460, the processor 22 again may determine the currently-predicted path of the host vehicle 12. According to one example, this block may be identical to block 415; therefore, it will not be re-discussed here. Following block 460, process 400B proceeds to block 463.

In block 463, the processor 22 may determine whether the currently-predicted path (block 460) matches the corresponding historical predicted path 49 (of the respective geotag 40). This block may be used to determine that the vehicle 12 is not merely at a same (or relatively nearby) geotag location, but that the vehicle 12 is also traveling in the same direction (as it was when the geotag was generated). When the currently-predicted path matches the historical predicted path, then process 400B proceeds to block 465. And when the currently-predicted path does not match the historical predicted path (e.g., when the vehicle 12 is traveling in a different direction than that associated with the geotag 40), then process 400B proceeds to block 405.

In block 465, the processor 22 determines whether the historical path stored within the identified geotag 40 (identified in block 455) matches the currently-predicted path (of block 460). Continuing with the example above, computer 14 may determine this by determining whether the historical center location 46 and historical radius 48 (which each correspond with the respective historical false alert location 44) match the center point $C_{predicted}$ and radius $R_{predicted}$ of the currently-predicted path (block 460). When they match, process 400B may loop back to block 405, as any alert generated by the collision avoidance system 16 may not be false. Consequently, any generated alert may result in a true collision avoidance warning to the driver, which is desirable. However, when the currently-predicted path does not match a historical path associated with the historical false alert location data 44, then process 400B may proceed to block 470.

In block 470, the currently-predicted path (determined in block 460) may be replaced within the collision avoidance system 16 with the historical path of the respective geotag 40. For instance, continuing again with the above example, the false alert detection system 18 may replace the center point $C_{predicted}$ and radius $R_{predicted}$ of the currently-predicted path with historical location 46 and historical radius 48 (e.g., which each correspond to the historical false alert location 44 of the respective geotag 40 (determined in block 455)). In this manner, based on the updated currently-predicted path, the collision avoidance system 16 may not generate a warning to the driver based on the false alert. To further illustrate, returning to FIG. 2, using process 400, computer 14 may not improperly evaluate collision avoidance data and thereby determine that host vehicle 12 (on hill 72) is going to collide with target vehicle 30 (on bridge 74). Similarly, returning to FIG. 3, using process 400, computer 14 may not improperly evaluate collision avoidance data and thereby determine that host vehicle 12 is going to collide with target vehicle 30 at intersection 78. Thus, at false alert detection system 18, by replacing the currently-predicted path data (with historical path data from a geotag 40) and returning it to collision avoidance system 16, the driver may experience fewer false warnings. This improves the user experience and elevates customer satisfaction. Following block 470, process 400B may end (435) or loop back to block 405 and repeat one or more blocks described above.

Other examples of process 400 also exist. For example, according to one implementation, geotags 40 (of memory 24) are not parsed by processor 22 in block 455 unless the vehicle 12 is within a predetermined range of historical starting point location (or historical center location). For instance, computer 14 may determine that a nearest starting point location is 100 miles away, and based on this determination, process 400B may not be executed for a period of time (e.g., assuming average vehicle speed of 60 miles per hour, process 400B may not be executed for at least 1 hour, as at an average of 60 mph, vehicle 12 cannot arrive at the starting point location any sooner than 1.67 hours). In this manner, computational resources may be conserved. Of course, a nearest starting point location of 100 miles is merely an example. Other predetermined ranges could be used instead.

Thus, there has been described a route learning system for a vehicle. The system includes a computer that determines a false alert and stores a false alert geotag based on the determination. Later, the computer may determine—using the geotag—that the vehicle is traversing the same geographic location, and in response to this determination, the computer may mitigate the actuation of false warnings to a driver of the vehicle when the computer's currently-predicted path does not match historical path data of the geotag.

In general, the computing systems and/or devices described may employ any of a number of computer operating systems, including, but by no means limited to, versions and/or varieties of the Ford SYNC® application, AppLink/Smart Device Link middleware, the Microsoft® Automotive operating system, the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OSX and iOS operating systems distributed by Apple Inc. of Cupertino, Calif., the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board vehicle computer, a computer workstation, a server, a desktop, notebook, laptop, or handheld computer, or some other computing system and/or device.

Computing devices generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

The processor is implemented via circuits, chips, or other electronic component and may include one or more microcontrollers, one or more field programmable gate arrays (FPGAs), one or more application specific circuits ASICs), one or more digital signal processors (DSPs), one or more customer integrated circuits, etc. The processor may be programmed to process the sensor data. Processing the data may include processing the video feed or other data stream captured by the sensors to determine the roadway lane of the host vehicle and the presence of any target vehicles. As described below, the processor instructs vehicle components to actuate in accordance with the sensor data. The processor may be incorporated into a controller, e.g., an autonomous mode controller.

The memory (or data storage device) is implemented via circuits, chips or other electronic components and can include one or more of read only memory (ROM), random access memory (RAM), flash memory, electrically programmable memory (EPROM), electrically programmable and erasable memory (EEPROM), embedded MultiMediaCard (eMMC), a hard drive, or any volatile or non-volatile media etc. The memory may store data collected from sensors.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

The invention claimed is:

1. A method, comprising:
    in response to determining that a current location matches a historical location, retrieving from memory false alert geotag that includes historical path data; and
    based on determining that a currently-predicted path does not match the historical path, replacing the currently-predicted path with the historical path to mitigate a false warning to a driver of a host vehicle.

2. The method of claim 1, wherein the geotag was stored previously in memory in response to:
    receiving a collision avoidance alert; and
    determining that an actual path of the vehicle, after receiving the alert, differed from a predicted path at a time thereof.

3. The method of claim 2, wherein the alert is based at least partially on receiving a vehicle-to-vehicle communication from a target vehicle.

4. The method of claim 2, wherein the actual path is determined using a plurality of path points.

5. The method of claim 4, wherein each of the path points comprise a respective pair of x- and y-coordinates, wherein, in determining the actual path, a respective z-axis coordinate of each respective path point is ignored.

6. The method of claim 2, further comprising: storing a first path point, then storing a second path point following a first interval, and then storing a third path point following a second interval.

7. The method of claim 1, wherein determining that the currently-predicted path does not match the historical path further comprises comparing a predicted radius or predicted curvature of the currently-predicted path with a historical radius of the historical path or a corresponding historical curvature thereof.

8. The method of claim 7, wherein determining that the currently-predicted path does not match the historical path further comprises comparing a predicted radius or predicted curvature of the currently-predicted path with a historical radius of the historical path or a corresponding historical curvature thereof.

9. The method of claim 1, further comprising determining a range to a nearest starting point location from among a plurality of false alert geotags, and based on the determined range, delaying comparing current location with historical location data of the plurality.

10. The method of claim 1, further comprising: replacing the currently-predicted path at a false alert detection system; and sending the replaced currently-predicted path from the false alert detection system to a collision avoidance system which generated an alert.

11. A system, comprising:
    a processor; and
    memory storing instructions executable by the processor, the instructions comprising, to:
        in response to determining that a current location matches a historical location, retrieve from memory false alert geotag that includes historical path data; and
        based on determining that a currently-predicted path does not match the historical path, replace the currently-predicted path with the historical path to mitigate a false warning to a driver of a host vehicle.

12. The system of claim 11, wherein the geotag was stored previously in memory in response to instructions to:
    receive a collision avoidance alert; and
    determine that an actual path of the vehicle, after receiving the alert, differed from a predicted path at a time thereof.

13. The system of claim 12, wherein the alert is based at least partially on receiving a vehicle-to-vehicle communication from a target vehicle.

14. The system of claim 12, wherein the actual path is determined using a plurality of path points.

15. The system of claim 14, wherein each of the path points comprise a respective pair of x- and y-coordinates, wherein, in determining the actual path, a respective z-axis coordinate of each respective path point is ignored.

16. The system of claim 12, wherein the instructions further comprise, to: store a first path point, then store a second path point following a first interval, and then store a third path point following a second interval.

17. The system of claim 11, wherein the instruction to determine that the currently-predicted path does not match the historical path further comprises an instruction to compare a predicted radius or predicted curvature of the currently-predicted path with a historical radius of the historical path or a corresponding historical curvature thereof.

18. The system of claim 17, wherein the instruction to determine that the currently-predicted path does not match the historical path comprises an instruction to compare a predicted center of a circle that comprises the predicted radius or predicted curvature with a historical center location of a circle associated with the historical radius or a corresponding historical curvature thereof.

19. The system of claim 11, further comprising determining a range to a nearest starting point location from among a plurality of false alert geotags, and based on the determined range, delaying comparing current location with historical location data of the plurality.

20. The system of claim 11, wherein the instructions further comprise, to: replace the currently-predicted path at a false alert detection system; and send the replaced currently-predicted path from the false alert detection system to a collision avoidance system which generated an alert.

* * * * *